United States Patent
Kaufmann et al.

(10) Patent No.: US 9,314,721 B2
(45) Date of Patent: Apr. 19, 2016

(54) FILTER SYSTEM WITH SEAL

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN + HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 14/475,004

(22) Filed: Sep. 2, 2014

(65) Prior Publication Data
US 2015/0060351 A1 Mar. 5, 2015

(30) Foreign Application Priority Data
Sep. 2, 2013 (DE) .......................... 10 2013 014 494

(51) Int. Cl.
*B01D 35/30* (2006.01)
*B01D 46/00* (2006.01)
*B01D 46/24* (2006.01)

(52) U.S. Cl.
CPC ............ *B01D 35/30* (2013.01); *B01D 46/0004* (2013.01); *B01D 46/0024* (2013.01); *B01D 46/0046* (2013.01); *B01D 46/2407* (2013.01); *B01D 2265/021* (2013.01); *B01D 2271/027* (2013.01)

(58) Field of Classification Search
None
See application file for complete search history.

(56) References Cited

U.S. PATENT DOCUMENTS

| 2,696,915 | A | * | 12/1954 | Kasten et al. .................. 210/437 |
| 4,743,374 | A | * | 5/1988 | Stifelman ...................... 210/440 |
| 5,326,138 | A | * | 7/1994 | Claes et al. .................... 285/110 |
| 6,843,378 | B1 | * | 1/2005 | Kiderman et al. ............. 210/450 |
| 2006/0118476 | A1 | * | 6/2006 | Weindorf ............. B01D 35/153 210/234 |
| 2009/0071111 | A1 | | 3/2009 | Lundgren |
| 2011/0083409 | A1 | | 4/2011 | Bannister |

FOREIGN PATENT DOCUMENTS

| DE | 102007014912 A1 | 10/2008 |
| DE | 102008062954 A1 | 7/2010 |
| EP | 0791387 A1 | 8/1997 |
| FR | 2712506 A1 * | 5/1995 |

* cited by examiner

*Primary Examiner* — Krishnan S Menon
*Assistant Examiner* — Ryan B Huang
(74) *Attorney, Agent, or Firm* — James Hasselbeck

(57) ABSTRACT

A filter system has a housing with a housing wall and at least one cover. An inlet is arranged on the housing and feeds a liquid to be filtered into the housing. An outlet is arranged on the housing and discharges the liquid that has been filtered from the housing. At least one filter element is arranged between the inlet and the outlet and separates a raw side of the filter system from a clean side of the filter system. A gasket is arranged between a sealing surface of the housing wall and a sealing surface of the cover. The gasket is held in position in a longitudinal direction of the housing by at least one retaining element that is arranged on the cover or on the housing wall.

5 Claims, 6 Drawing Sheets

FILTER SYSTEM WITH SEAL

BACKGROUND OF THE INVENTION

The invention relates to a filter system with a seal, particularly for use as an air filter of a combustion engine.

A filter system is known from US2011083409A1 in which the filter housing is sealed off by a gasket in the form of an O-ring gasket that is arranged between a housing wall and a cover of the filter housing. The gasket is placed into an axial groove with a conical cross section that is arranged on a circumferential collar of the cover. When the cover is closed, a circumferential ring that is mounted on the housing wall is pressed on the gasket such that the latter is compressed and pressed into the conical groove. A ring lying in the groove provides additional pressing of the seal. The sealing of the filter housing is thus ensured. As a result of the pressing of the gasket into the conical groove upon closing of the cover, the gasket is additionally fixed in its position. However, when the gasket is placed into the groove of the cover during assembly, it is not ensured that it will remain fixed in its position during closing of the cover, since pressing into the conical groove occurs only upon closing of the cover. When the cover is opened in order to replace a filter element, the gasket can also fall out of the groove and be lost. One alternative is therefore to glue the gasket in place.

It is therefore an object of the invention to provide a filter system that makes it possible to ensure a reliable and assembly-friendly way to seal the filter system through simple and cost-effective measures.

SUMMARY OF THE INVENTION

The abovementioned objects are achieved according to one aspect of the invention with a filter system that comprises a gasket arranged between a sealing surface of a housing wall and a sealing surface of a cover. The gasket is held in position in a longitudinal direction by at least one retaining element that is arranged on the cover or on the housing wall.

Advantageous embodiments and advantages of the invention follow from the other claims, the description and the drawing.

A filter system is proposed in which the filter system comprises a housing with housing wall and at least one cover, an inlet arranged on the housing for feeding a fluid to be filtered, particularly air, an outlet arranged on the housing for discharging the filtered fluid, at least one filter element that is arranged between inlet and outlet and separates a raw side from a clean side, as well as a gasket arranged between a sealing surface of the housing wall and a sealing surface of the cover. The gasket is held in position in a longitudinal direction by at least one retaining element that is arranged on the cover or on the housing wall.

The solution according to the invention provides that a seal, for example, an O-ring seal, is held positively in its position during assembly by retaining elements, for example in the form of retaining pins, thus enabling radial sealing of the filter housing. This constitutes an advantage over the prior art, in which gaskets for sealing the housing are adhered in place or held in position nonpositively during assembly so that only an axial sealing action is possible.

The advantages lie in a more cost-effective solution in regard to loss prevention compared to a solution in which adhesion is used, and in a more secure solution in regard to loss prevention in case of replacement of a filter element during maintenance compared to a nonpositive solution. In addition, the retaining elements of the gasket have the additional function of providing anti-rotation protection for the cover in relation to the housing wall. What is more, the radial sealing principle is less vulnerable to tolerance fluctuations of the components than the axial sealing principle.

Advantageously, the at least one retaining element can be arranged radially on the outside surface of a collar of the cover. This provides good accessibility during placement of the seal. Moreover, this enables visual inspection during assembly of the cover with gasket in place.

In one expedient embodiment, the at least one retaining element can engage in at least one groove that is arranged on an outer peripheral section of the housing wall such that the cover can be mounted axially in a rotation-proof manner. This is very advantageous in filter systems that are used under vibrational load, for example, on combustion engines in motor vehicles, where both the cover and the filter element, which is supported e.g. on the cover, can otherwise rotate during operation.

Advantageously, two or more ribs can be arranged on a radially inner collar of the housing wall into which the at least one retaining element engages, thus enabling the axial anti-rotation protection of the cover. In this way, an additional and cost-effectively producible anti-rotation protection of the cover can be provided.

In another advantageous embodiment, the at least one retaining element can be embodied as an aligning element that engages in at least one groove that is embodied as a corresponding counter-element arranged on an outer peripheral section of the housing wall so that the cover can be mounted axially in an angularly aligned manner. As a result, the cover can only be mounted in one angular position. Moreover, the filter element is frequently also associated with the cover during assembly in a likewise angularly aligned manner so that the entire filter system can then be assembled such that the individual components are at a clear angular position with respect to each other. This results in stable and reproducible conditions of the flow field during operation for the fluid to be filtered. It is thus possible, for example, to perform measurements using a hot-film air mass meter (HFM) for high-quality engine control. Such sensors otherwise react sensitively to different flow fields as a result of different flow geometries that can arise, for example, as a result of different installation positions of filter elements, support pipes, and secondary elements.

In an alternative embodiment, the at least one retaining element can also be arranged radially on the outside surface of a collar of the housing wall. As a result, a similar solution for fixing the position of a gasket can be achieved as described above. The only difference is that the retaining elements and counter-elements such as the grooves are reversed between cover and housing.

Accordingly, the at least one retaining element can engage in at least one groove that is arranged on an outer peripheral section of the cover so that the cover can be assembled axially in a rotation-proof manner. This function can thus also be achieved in the same way as described previously.

In precisely the same way, two or more ribs can preferably be arranged on a radially inner collar of the cover in which the at least one retaining element engages, thus constituting an axial rotation prevention of the cover.

Similarly, the at least one retaining element can be embodied as an aligning element that engages in at least one groove embodied as a corresponding counter-element arranged on an outer peripheral section of the cover so that the cover can be mounted axially in an angularly aligned manner.

Even in the case of reversed retaining elements and counter-elements from the cover to the housing wall and vice versa, the described functions for the positioning of the gasket and of the cover during assembly can be expediently constituted.

Advantageously, the gasket can seal the housing radially via the sealing surfaces on the collar of the cover as well as on the collar of the housing. Since the gasket is not compressed axially in the retaining principle according to the invention, the gasket can perform a radial sealing function that has proven expedient with respect to the tolerance situations during assembly.

Expediently, however, axial compressing of the gasket can also be achieved by means of the two or more ribs, thus sealing the housing axially. This axial sealing action can be provided in addition to a radial sealing action, thus constituting an additional safety factor.

In one advantageous embodiment, the at least one retaining element can be integrally manufactured (monolithic) with the cover or the housing wall. Advantageously, during the manufacture of the filter housing, for example in a plastic injection-molding process, the retaining element is injected-molded along with it, so that the entire housing wall or the cover can be produced in a process that is as cost-effective as possible. The retaining elements, which can be embodied in the form of retaining pins, for example, are expediently designed in an injection-molding-compatible manner with spotting edges for demolding upon conclusion of the injection-molding process.

BRIEF DESCRIPTION OF THE DRAWINGS

Additional advantages can be seen from the following description of the drawings. The drawings show exemplary embodiments of the invention. The drawings, the description, and the claims contain numerous features in combination. A person skilled in the art will expediently also consider the features individually and combine them into other expedient combinations.

In the Figures, same or similar components are designated with the same reference symbols. The Figures merely show examples and must not be understood as being limiting.

DESCRIPTION OF PREFERRED EMBODIMENTS

Figure 1:
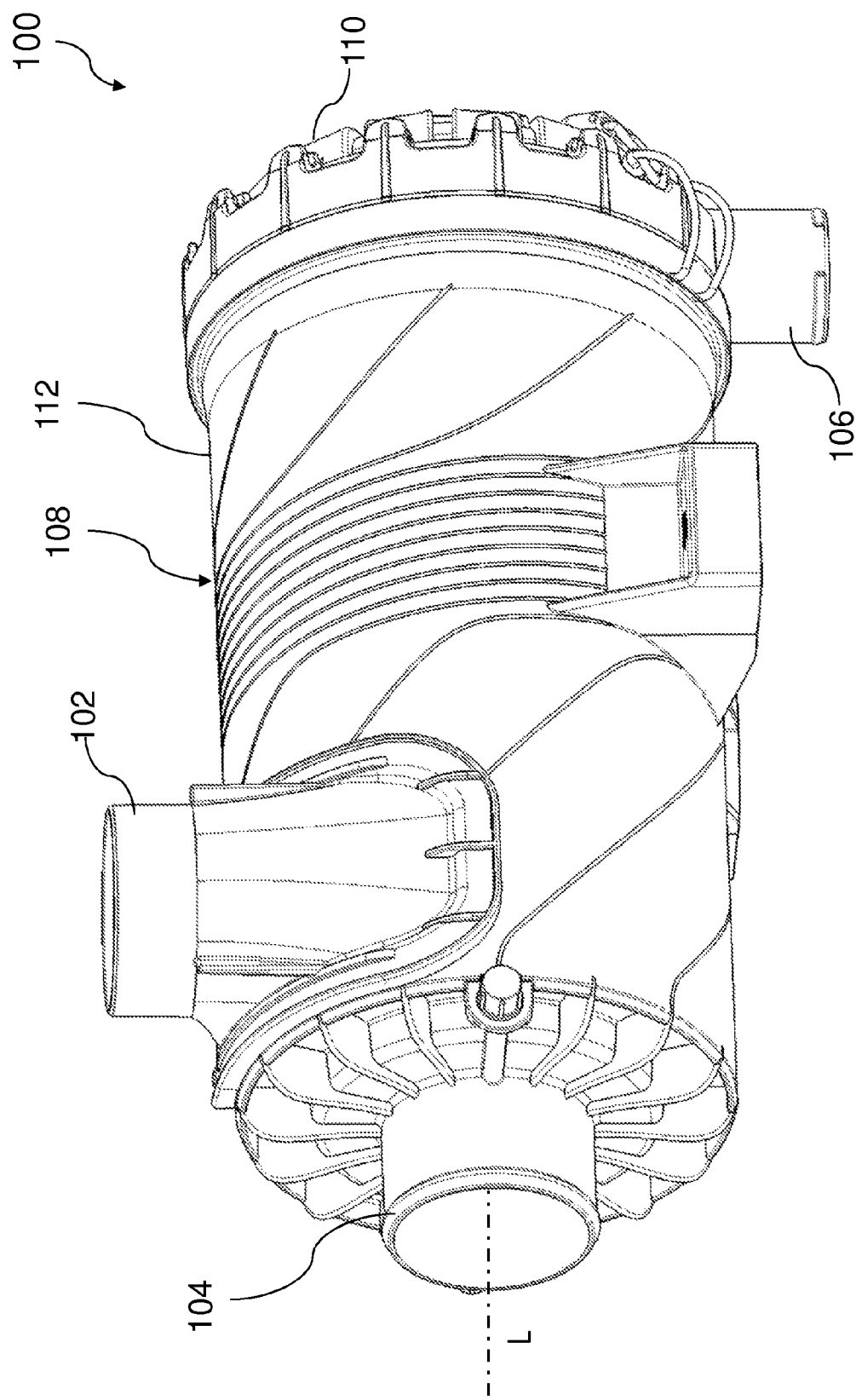
FIG. 1 shows a perspective view of a two-stage filter system with a cyclone separator according to one exemplary embodiment of the invention, shown from the side of the outlet fitting.

FIG. 1 shows a perspective view of a two-stage filter system 100 with a cyclone separator 36 according to one exemplary embodiment of the invention, shown from the side of the outlet 104, with tangential inlet 102, center outlet 104 on a housing front side and bottom-side dirt outlet 106. A round filter shape is shown that consists of a housing 108 that has a housing wall 112 and is closed with a cover 110, for example by a screw or bayonet closure. When used as an air filter system, dust-laden air flows into the inlet 102, which is arranged tangentially to the air filter element installed in the interior, so that the air in the interior of the housing 108 is made to move rotationally by an inflow protector on the filter element. Filter element and inflow protector are not shown in the drawing. As a result of the cyclone effect brought about by the rotational movement of the air, centrifugal forces act on the dust particles of the flowing air so that they are separated out partially on the housing wall and can flow out of the filter system 100 through the dirt outlet 106. As a result, the load on the filter element is reduced, thus increasing the service life of the filter element. The cleaned air can be discharged from the housing 108 via the center outlet 104.

Such filter systems, as shown in FIG. 1, are usually used as air and/or particle filters, particularly for combustion engines in construction and agricultural machines. They are characterized by great robustness and, due to their high filter load, have short service lives. A filter system 100 with a loaded filter element must tolerate an increase in weight of 10 kg or more.

Figure 2:
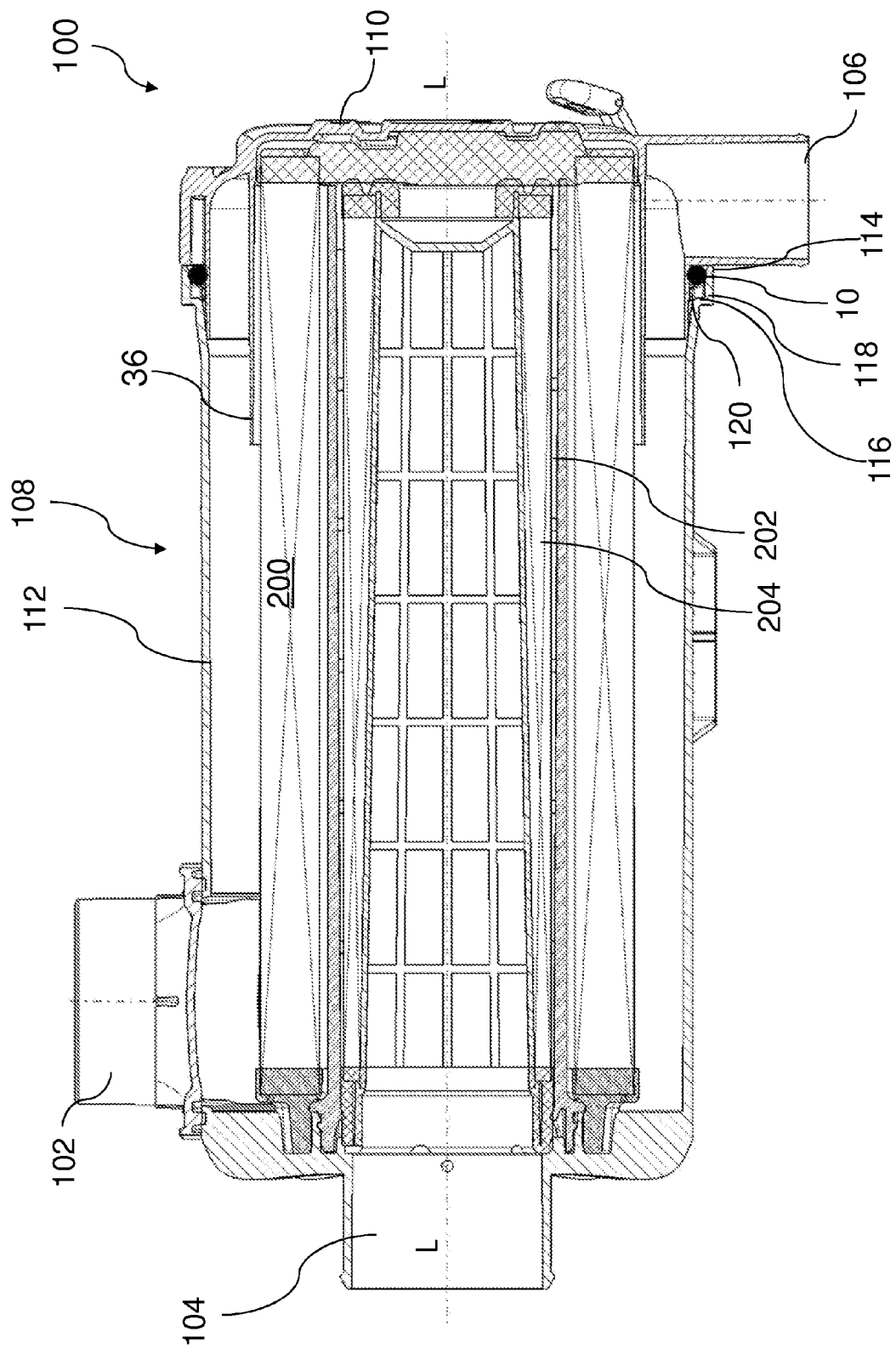
FIG. 2 shows a longitudinal section through a filter system according to one exemplary embodiment of the invention.

FIG. 2 shows a longitudinal section through a filter system 100 according to one exemplary embodiment of the invention. Here, the filter system 100 comprises a housing 108 with housing wall 112 and a cover 110, an inlet 102 arranged on the housing 108 for feeding in a fluid to be filtered, particularly air, an outlet 104 arranged on the housing 108 for discharging the filtered fluid, a filter element 200 that is arranged between inlet 102 and outlet 104 and separates a raw side from a clean side, as well as a gasket 10 arranged between a sealing surface 114 of the housing wall 112 and a sealing surface 116 of the cover 110. The gasket 10 is held in position in a longitudinal direction L by at least one retaining element 12 that is arranged on the cover 110 or on the housing wall 112. The sealing surface 114 of the housing wall 112 is arranged on a collar 118, and the sealing surface 116 of the cover 110 is arranged on a collar 120. A support pipe 202 and a secondary element 204 are arranged on the interior of the filter element 200 centrically with respect to the longitudinal axis L. The support pipe 202 serves to stiffen and support the filter element 200, and the secondary element 204, which also has a filter medium, protects the clean air region from penetrating dirt when the filter element 200 is being replaced and remains in the filter system 100 when the filter element 200 is changed.

Figure 3:
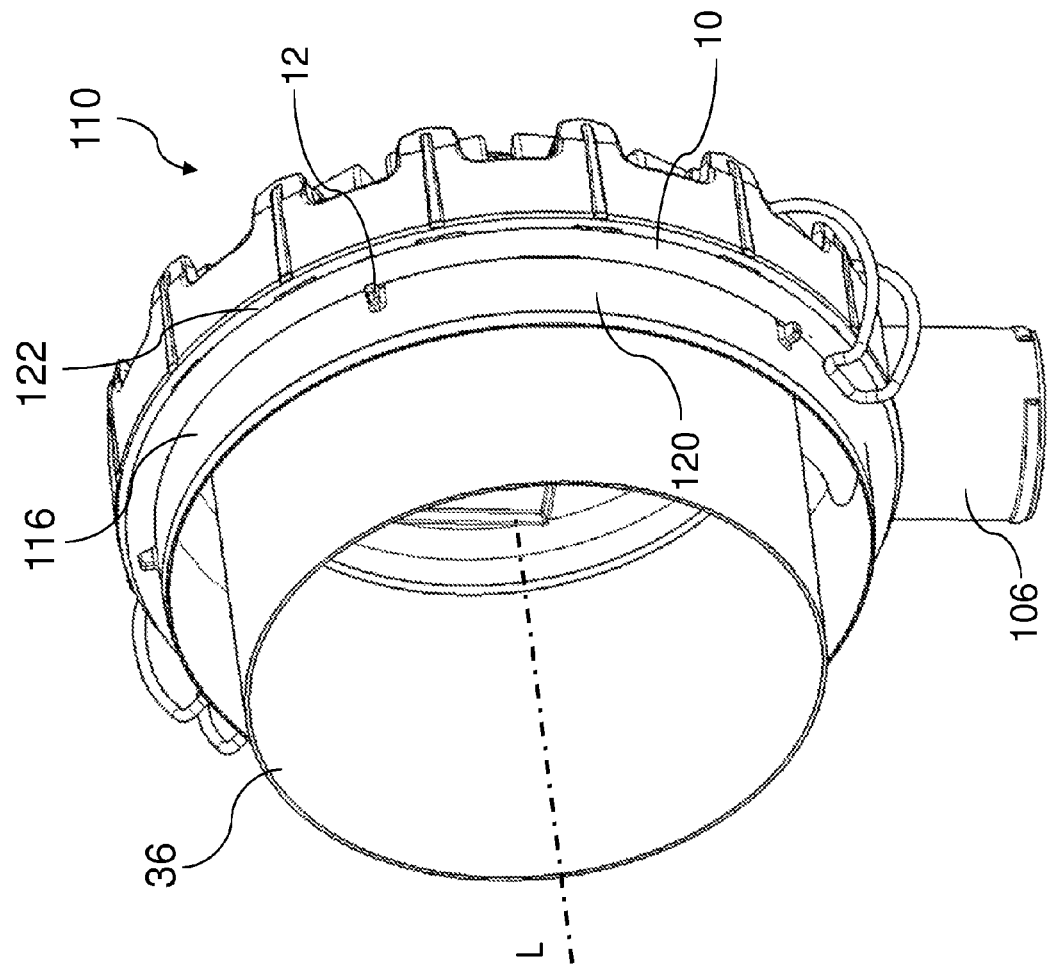
FIG. 3 shows a perspective view of a cover with retaining elements and inserted gasket according to one exemplary embodiment of the invention.

FIG. 3 shows a perspective view of a cover 110 with retaining elements 12 and inserted gasket 10 according to one exemplary embodiment of the invention. The retaining elements 12 are arranged radially on the outside surface of a collar 120 of the cover 110, which collar 120 also serves as a sealing surface 116 for a radial sealing of the housing 108 by the gasket 10. The gasket 10 is pushed over the collar 120 and over the retaining elements 12 and is then held in position in the axial longitudinal direction L by the retaining elements 12. The other bearing surface of the gasket is the circumferential edge 122 of the cover 110, which acts as the end of the collar 120.

Figure 4:
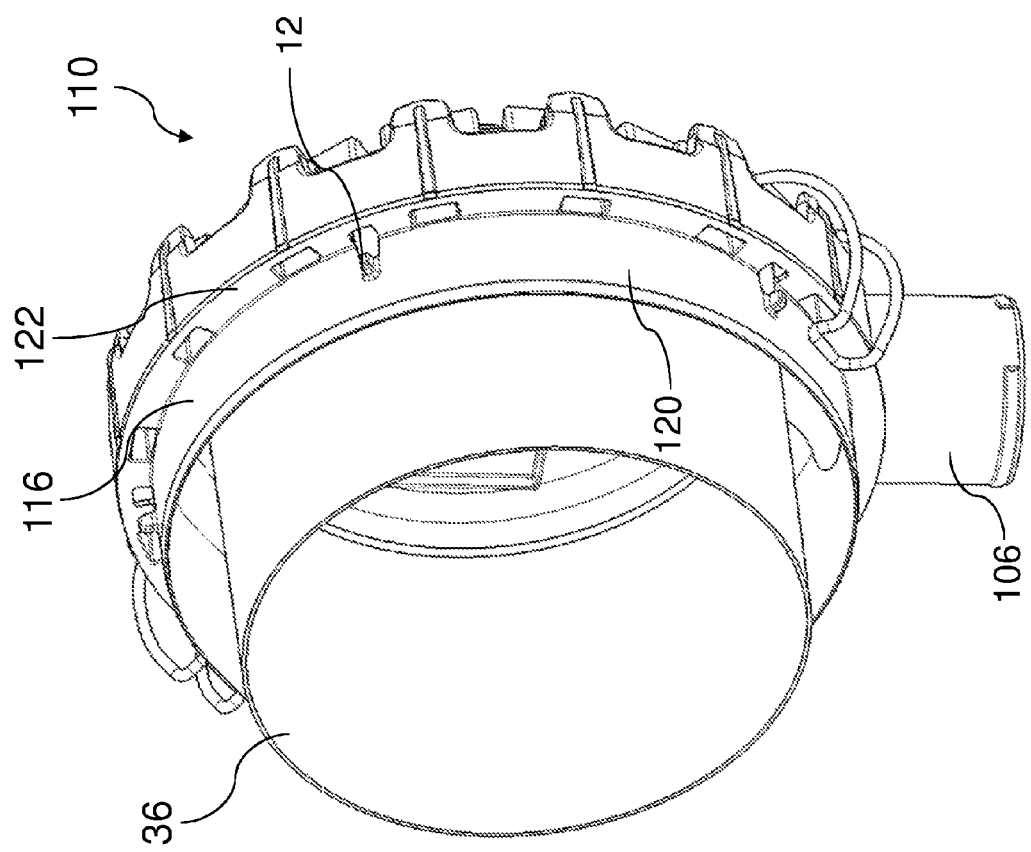
FIG. 4 shows a perspective view of a cover with retaining elements without gasket according to one exemplary embodiment of the invention.

FIG. 4 shows the same perspective view of the cover 110 with retaining elements 12 without gasket 10. The retaining elements 12 are embodied here in the form of retaining pins that keep a diameter of the gasket up to the edge 122 of the cover 110 open.

In an alternative embodiment that is not shown here, however, the at least one retaining element 12 can also be arranged radially on the outside surface of a collar 118 of the housing wall 112. The at least one retaining element 12 can engage in at least one groove 14 that is arranged on an outer peripheral section of the cover 110 so that the cover 110 can be assembled axially in a rotation-proof manner.

Furthermore, two or more ribs 16 can be arranged on a radially inner collar 120 of the cover 110 into which the at least one retaining element 12 engages, thus providing an axial anti-rotation device for the cover 110. Moreover, the at least one retaining element 12 can be embodied as an aligning element 18 that engages in at least one groove 14 embodied as a corresponding counter-element 20 arranged on an outer peripheral section of the cover 110 so that the cover 110 can be assembled axially in an angularly aligned manner.

Figure 5:
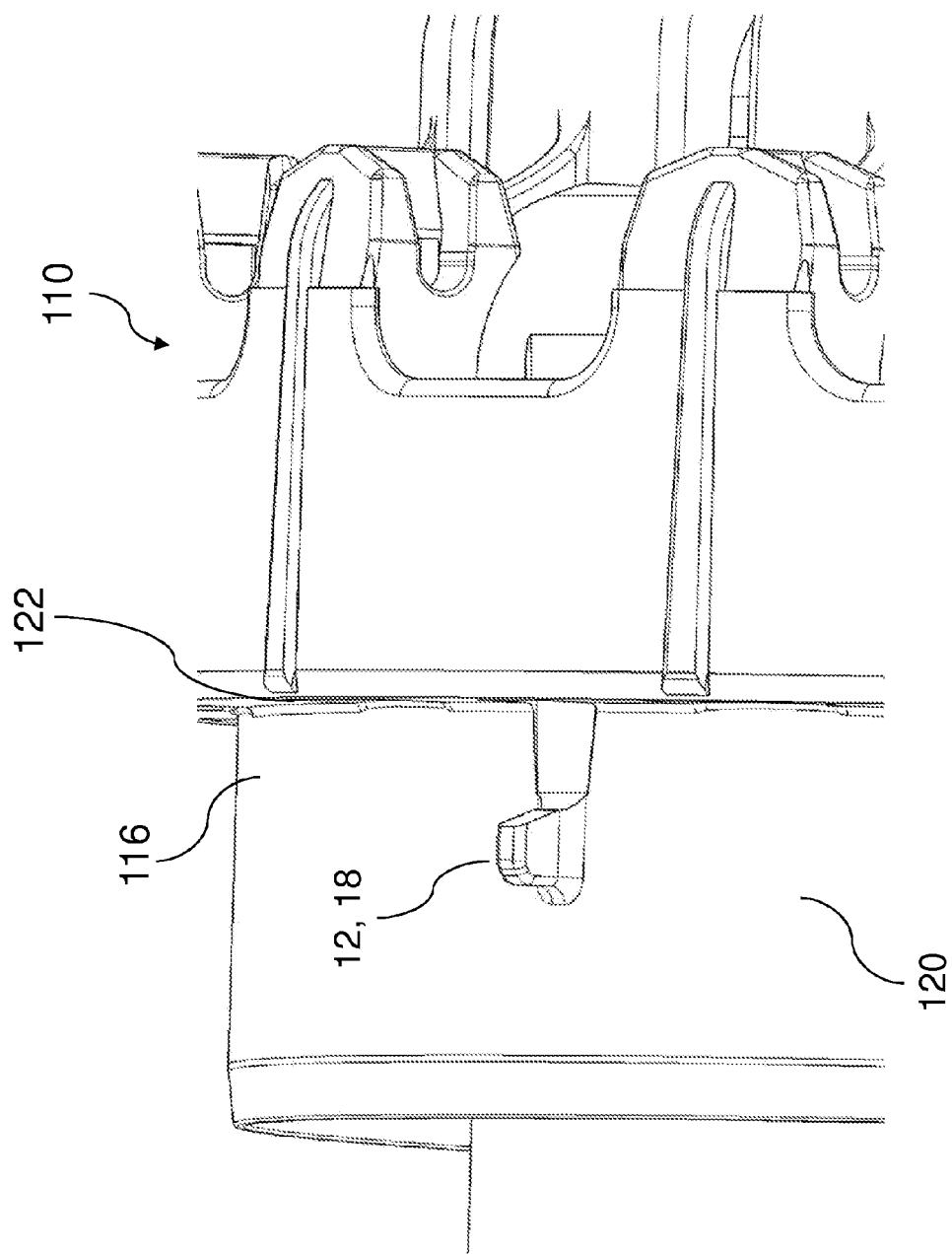
FIG. 5 shows a detail view of a retaining element according to one exemplary embodiment of the invention.

FIG. 5 shows a detailed view of a retaining element 12 according to one exemplary embodiment of the invention. The retaining element 12 in the form of a retaining pin is arranged radially on the outside surface of the collar 120 of the cover 110 that simultaneously also serves as a radial sealing surface 116 for the inserted gasket 10. The retaining element 12 is manufactured with the cover 110 in an injection-molding process and thus embodied as a typical injection-molded part. The retaining element 12 has a chamfer in the direction of the edge 122 of the cover 110 over which the gasket 10 can easily be inserted. The at least one retaining element 12 can be embodied as an aligning element 18 that engages in at least one groove 14 embodied as a corresponding counter-element 20 arranged on an outer peripheral section of the housing wall 112 so that the cover 110 can be assembled axially in an angularly aligned manner.

Figure 6:
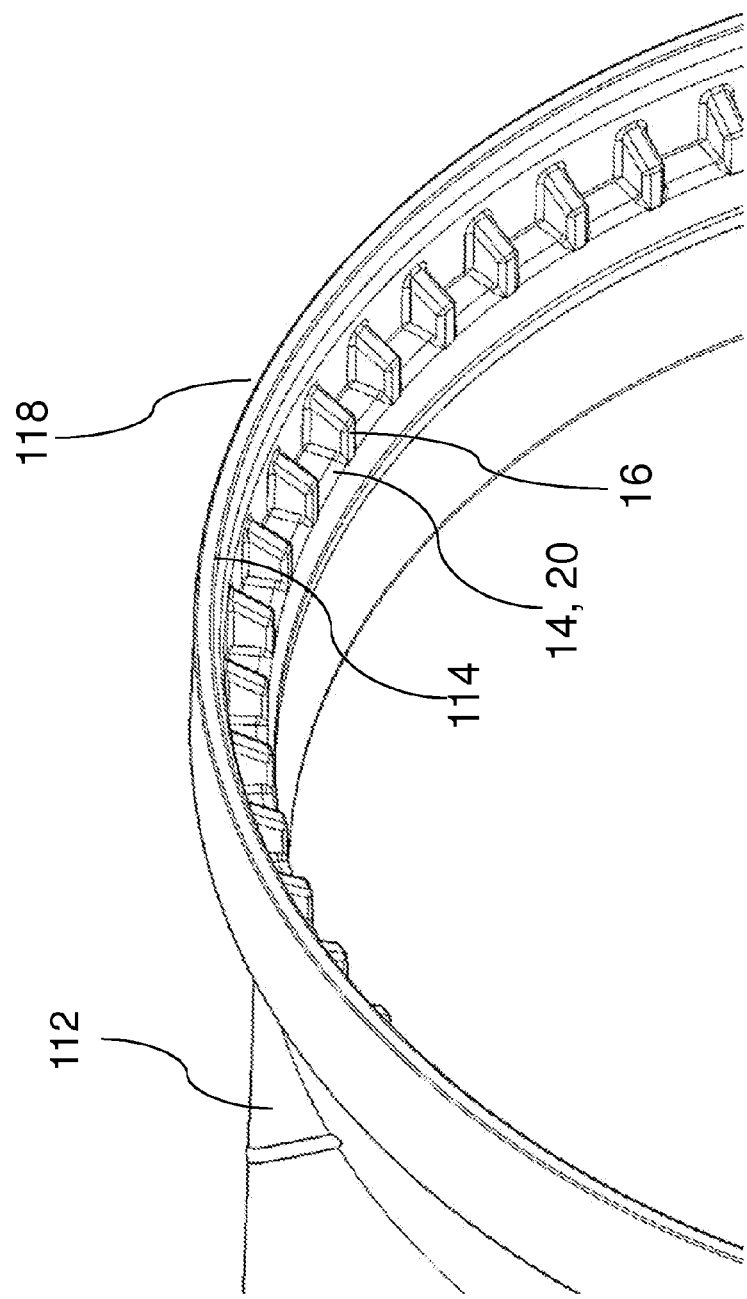
FIG. 6 shows a detail view of a housing wall with ribs and grooves as aligning elements and counter-elements according to one exemplary embodiment of the invention.

FIG. 6 shows a detailed view of a housing wall 112 with ribs 16 and grooves 14 as counter-elements 20 for aligning elements 18 that are arranged on the cover 110 on a circumferential radially inner collar 116 according to one exemplary embodiment of the invention. The retaining elements 12 can dip into the grooves 14 between the ribs 16, thus serving as aligning elements 18 for providing anti-rotation protection for the assembled cover 110. The at least one retaining element 12 can engage at least one groove 14 such that the cover 110 can be assembled axially in a rotation-proof manner. Moreover, an axial pressing of the gasket can be achieved via the two or more ribs 16, thus sealing the housing 108 axially on the housing wall 112 and cover 112 in addition to the radial sealing action via the two sealing surfaces 114, 116. This provides additional safety in regard to sealing of the filter system 100.

While specific embodiments of the invention have been shown and described in detail to illustrate the inventive principles, it will be understood that the invention may be embodied otherwise without departing from such principles.

What is claimed is:

1. A filter system comprising:
   a housing with a housing wall and at least one cover arranged on a first axial end of the housing;
   an inlet arranged on the housing and adapted to feed a liquid to be filtered into the housing;
   an outlet arranged on the housing and adapted to discharge the liquid that has been filtered from the housing;
   at least one filter element arranged between the inlet and the outlet and separating a raw side of the filter system from a clean side of the filter system;
   a gasket arranged between a sealing surface of the housing wall and a sealing surface of the cover;
   wherein the gasket is positionally secured in a longitudinal direction of the housing by a plurality of retaining elements;
   wherein the at least one cover includes
      an axially projecting annular collar having a radially outwardly oriented outer surface forming a portion of a radially outer surface of the cover;
      wherein the radially outwardly oriented outer surface of the annular collar forms the sealing surface of the cover;
   wherein the sealing surface of the housing is arranged on a radially interior surface of the housing wall at the first axial end of the housing;
   wherein the plurality of retaining elements are on and projects outwardly from the radially outwardly oriented outer surface of the annular collar, contacting a first axial side of the gasket, holding the gasket in position on the annular collar;
   a plurality of axially elongated radially inwardly projecting ribs formed on the radially interior surface of the housing wall, the axially elongated ribs spaced apart in a circumferential direction on the radially interior surface of the housing wall;
   a plurality of circumferentially spaced apart axial grooves formed on the radially interior surface of the housing wall, the plurality of circumferentially spaced apart axial grooves formed by circumferential spacing between adjacent ones of the plurality of axially elongated radially inwardly projecting ribs;
   wherein respective ones of the plurality of retaining elements engage into and anti-rotation lock into respective ones of the plurality of axially extending grooves in an axial direction, the engagement of the respective ones plurality of retaining elements engage into the respective one of the plurality of axially extending grooves preventing rotation of the cover to the housing while maintaining angular alignment of the cover to the housing during axial assembly of the cover onto the housing.

2. The filter system as claimed in claim 1, wherein
   wherein the sealing surface of the housing is arranged axially between the plurality of radially inwardly projecting ribs and the first axial end of the housing;
   wherein the plurality of radially inwardly projecting ribs have an axial end surface facing the first axial end of the housing, wherein the gasket is axially compressed by the axial end surface of the plurality of ribs to compress the gasket to seal against the sealing surface of the housing wall and the sealing surface of the cover.

3. The filter system as claimed in claim 1, wherein the gasket is axially compressed by the plurality of inwardly projecting ribs to seal the housing axially.

4. The filter system as claimed in claim 1, wherein the gasket seals the housing radially.

5. The filter system as claimed in claim 1, wherein the plurality of at least one retaining elements are monolithic with the cover.

* * * * *